United States Patent
Yamazaki et al.

(10) Patent No.: US 8,306,572 B2
(45) Date of Patent: Nov. 6, 2012

(54) COMMUNICATION CONTROL METHOD, COMMUNICATION SYSTEM AND COMMUNICATION CONTROL APPARATUS

(75) Inventors: Chiharu Yamazaki, Yokohama (JP); Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 151 days.

(21) Appl. No.: 12/593,733

(22) PCT Filed: Mar. 25, 2008

(86) PCT No.: PCT/JP2008/055565
§ 371 (c)(1), (2), (4) Date: May 14, 2010

(87) PCT Pub. No.: WO2008/123243
PCT Pub. Date: Oct. 16, 2008

(65) Prior Publication Data
US 2010/0248734 A1 Sep. 30, 2010

(30) Foreign Application Priority Data
Mar. 29, 2007 (JP) .................................. 2007-089410

(51) Int. Cl.
*H04B 1/00* (2006.01)
*H04M 1/00* (2006.01)
(52) U.S. Cl. .................... 455/561; 455/562.1; 455/452.2
(58) Field of Classification Search .................. 455/561, 455/562.1, 452.2
See application file for complete search history.

(56) References Cited

U.S. PATENT DOCUMENTS

| | | | |
|---|---|---|---|
| 6,282,426 B1 * | 8/2001 | Wang | 455/456.3 |
| 7,039,441 B1 * | 5/2006 | Reudink et al. | 455/562.1 |
| 2002/0051430 A1 * | 5/2002 | Kasami et al. | 370/319 |
| 2006/0217158 A1 * | 9/2006 | Uwano et al. | 455/562.1 |

FOREIGN PATENT DOCUMENTS

| | | |
|---|---|---|
| JP | 11-234734 | 8/1999 |
| JP | 11-308037 | 11/1999 |
| JP | 2003-008494 | 1/2003 |
| JP | 2006-270216 | 10/2006 |

OTHER PUBLICATIONS

Japanese language office action dated May 22, 2012 and its English language translation issued in corresponding Japanese application 2007089410.

* cited by examiner

*Primary Examiner* — Meless N Zewdu
*Assistant Examiner* — William Nealon
(74) *Attorney, Agent, or Firm* — DLA Piper LLP (US)

(57) ABSTRACT

Based on a first weighting factor adopted for a first wireless base station 1-1 to direct its beam to a wireless communication apparatus 3, a communication control apparatus 2 calculates a second weighting factor so that the wireless communication apparatus 3 does not interfere with a second wireless base station 1-2 neighboring the first wireless base station 1-1 and the second wireless base station 1-2 interpolates a dead region of the first wireless base station 1-1, and transmits the second weighting factor to the second wireless base station 1-2 to generate a beam. A communication control method, a communication system and a communication control apparatus thereby achieve a stable communication without interference by the neighboring wireless base station while reducing the dead region.

7 Claims, 5 Drawing Sheets

FIG. 1
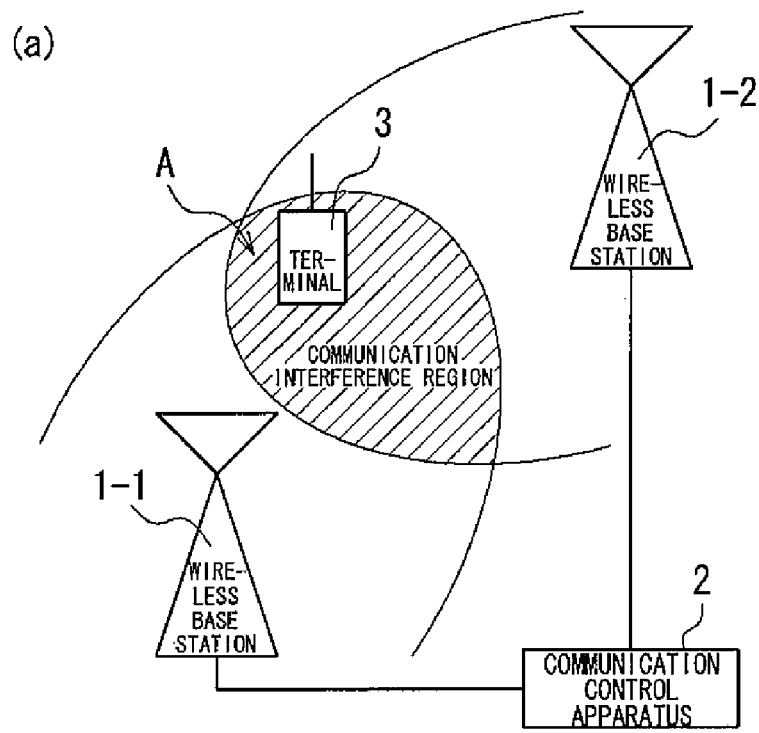
(a)
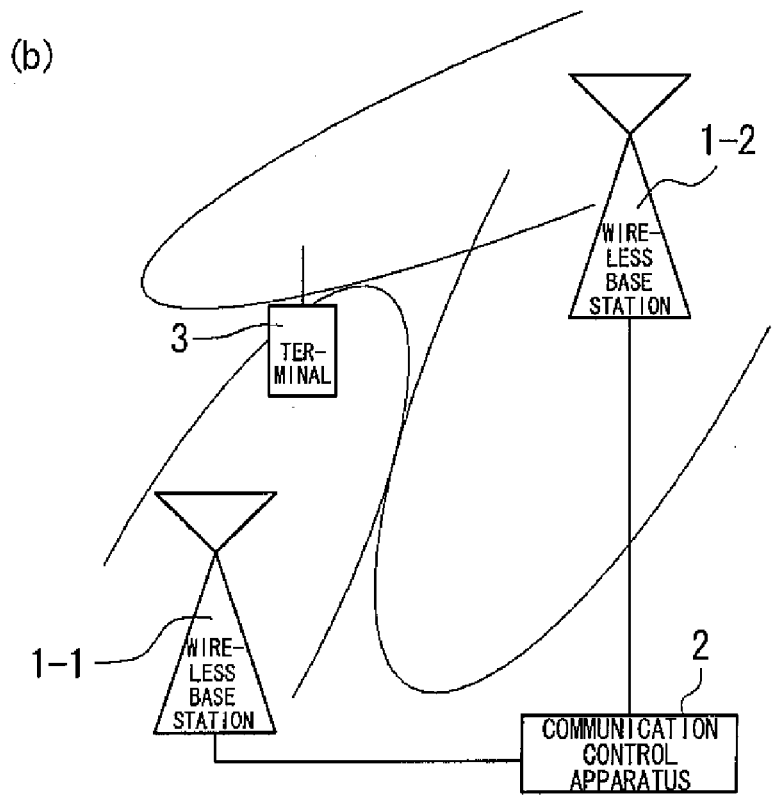
(b)

COMMUNICATION CONTROL METHOD, COMMUNICATION SYSTEM AND COMMUNICATION CONTROL APPARATUS

CROSS REFERENCE TO RELATED APPLICATION

This application is a national stage of international application No. PCT/JP2008/055565 filed on Mar. 25, 2008, the entire contents of which are incorporated herein by reference. This application also claims priority to and the benefit of Japanese Patent Application No. 2007-89410 filed, on Mar. 29, 2007, the entire contents of which are incorporated herein by reference.

TECHNICAL FIELD

The present invention relates to a communication control method, a communication system and a communication control apparatus.

BACKGROUND ART

A cellular system is conventionally known as a mobile communication system. In addition, a standardization of high-speed wireless communication such as WiMAX (Worldwide Interoperability for Microwave Access), for example, has been recently promoted.

The cellular system prevents radio waves from neighboring wireless base stations from interfering with one another by use of different frequency bands for the neighboring wireless base stations. The cellular system thus establishes a wireless communication network by use of a plurality of different frequency bands.

In contrast, WiMAX adopts TDD (Time Division Duplexing) which transmits and receives radio waves on the same frequency by dividing time for uplink and downlink. By synchronization of frame structures for each wireless base station, WiMAX prevents radio waves transmitted from one terminal from acting as interference radio waves to radio waves transmitted from another wireless base station with which another terminal is communicating.

However, it is assumed that, in light of an effective usage of limited frequencies, unlike the cellular system, it is difficult to assign different frequency bands to the neighboring wireless base stations in a wireless communication system such as WiMAX which uses wide frequency band. For that reason, using the same frequency band at neighboring wireless base stations generates a communication interference region therebetween because of the synchronization of frames between the wireless base stations.

When the communication interference region is generated, since a terminal in the region simultaneously receives radio waves transmitted from neighboring wireless base stations, there is a concern about difficulty to separate the transmission radio waves from one another in a region where reception intensities of the transmitted radio waves are at approximately the same level; which leads to a failure of handover to the neighboring wireless base station and disconnection.

Meanwhile, in order to reduce a dead region caused by interference, Japanese Patent Application Laid-open No. 11-308037, for example, suggests to form a null in directions of a plurality of wireless base stations by adopting adaptive arrays to antennas of the plurality of wireless base stations.

SUMMARY OF INVENTION

Technical Problem

The technique disclosed in Japanese Patent Application Laid-open No. 11-308037 described above, however, relates to a site diversity scheme for improving a transmission quality in a terminal by synthesizing radio waves simultaneously transmitted from a plurality of base stations and cannot be adopted for a system in which a terminal communicates with a single wireless base station.

Accordingly, an object of the present invention concerning such a condition is to provide a communication control method, a communication system and a communication control apparatus that achieve a stable communication without interference by a neighboring wireless base station while reducing a dead region.

Solution to Problem

In order to achieve the above object, the invention according to a first aspect is that a communication control method for a communication system including a plurality of wireless base stations having adaptive array antennas and a communication control apparatus for controlling the plurality of wireless base stations, includes:

a first weighting factor obtainment step at which the communication control apparatus obtains a first weighting factor adopted for beam generation of a first wireless base station, among the plurality of wireless base stations, which directs a beam to a wireless communication apparatus;

a communication interference region presumption step at which the communication control apparatus presumes a communication interference region between the first wireless base station and a second wireless base station, among the plurality of the wireless base stations, neighboring the first wireless base station based on the first weighting factor obtained;

a second weighting factor calculation step at which the communication control apparatus calculates a second weighting factor to be adopted for beam generation of the second wireless base station so as to avoid the presumed communication interference region;

a transmission step at which the communication control apparatus transmits information on the second weighting factor calculated to the second wireless base station;

a reception step at which the second wireless base station receives the information on the second weighting factor transmitted from the communication control apparatus; and a beam generation step at which the second wireless base station generates a beam based on the information on the second weighting factor received.

The invention according to a second aspect is that the communication control method according to the first aspect further includes:

a wireless base station recognition step at which the communication control apparatus recognizes a configuration state of the plurality of wireless base stations based on virtual space information based on a map;

a signal obtainment recognition step at which the communication control apparatus recognizes whether the first wireless base station has obtained a signal from the wireless communication apparatus after the second wireless base station generates a beam based on the received information on the second weighting factor;

a third weighting factor calculation step at which the communication control apparatus calculates a third weighting factor to be adopted for beam generation of the second wireless base station based on the virtual space information so as to avoid the presumed communication interference region, in a case where the first wireless base station has not obtained a signal from the wireless communication apparatus as a result of the recognition;

a second transmission step at which the communication control apparatus transmits information on the third weighting factor calculated to the second wireless base station;

a second reception step at which the second wireless base station receives the information on the third weighting factor transmitted from the communication control apparatus; and a second beam generation step at which the second wireless base station generates a beam based on the received information on the third weighting factor.

The invention according to a third aspect is that, in the communication control method according to the second aspect, the virtual space information includes information on a building based on the map, the second weighting factor is calculated based on a ray tracing method at the second weighting factor calculation step, and the third weighting factor is calculated based on the ray tracing method under a condition of a higher resolution than that of the calculation of the second weighting factor at the third weighing factor calculation step.

The invention according to a fourth aspect is that, in the communication control method according to the second aspect, the third weighting factor calculated at the third weighting factor calculation step is kept correspondingly to the virtual space information at the calculation of the third weighting factor, and then adopted as the second weighting factor.

The invention according to a fifth aspect is that, in the communication control method according to the third aspect, the third weighting factor calculated at the third weighting factor calculation step is kept correspondingly to the virtual space information at the calculation of the third weighting factor, and then adopted as the second weighting factor.

Moreover, in order to achieve the above object, the invention according to a sixth aspect is that, in a communication system including a plurality of wireless base stations having adaptive array antennas and a communication control apparatus for controlling the plurality of wireless base stations, a first wireless base station, among the plurality of wireless base stations, which directs a beam to a wireless communication apparatus has:

a first transmission unit for transmitting information on a first weighting factor adopted for generation of the beam to the communication control apparatus, the communication control apparatus has:

a first reception unit for receiving the information on the first weighting factor transmitted from the first wireless base station;

a communication interference region presumption unit for presuming a communication interference region between the first wireless base station and a second wireless base station, among the plurality of the wireless base stations, neighboring the first wireless base station based on the first weighting factor received;

a second weighting factor calculation unit for calculating a second weighting factor to be adopted for beam generation of the second wireless base station so as to avoid the presumed communication interference region; and a second transmission unit for transmitting information on the second weighting factor calculated to the second wireless base station, and the second wireless base station has:

a second reception unit for receiving the transmitted information on the second weighting factor; and a beam generation unit for generating a beam based on the received information on the second weighting factor.

Furthermore, in order to achieve the above object, the invention according to a seventh aspect is that a communication control apparatus for controlling a plurality of wireless base stations having adaptive array antennas, includes:

a first weighting factor obtainment unit for obtaining a first weighting factor adopted for beam generation of a first wireless base station, among the plurality of wireless base stations, which directs a beam to a wireless communication apparatus;

a communication interference region presumption unit for presuming a communication interference region between the first wireless base station and a second wireless base station, among the plurality of the wireless base stations, neighboring the first wireless base station based on the first weighting factor obtained;

a second weighting factor calculation unit for calculating a second weighting factor to be adopted for beam generation of the second wireless base station so as to avoid the presumed communication interference region; and a transmission unit for transmitting information on the second weighting factor calculated to the second wireless base station.

Advantageous Effects on Invention

According to the present invention, the communication control apparatus calculates a second weighting factor so that a wireless communication apparatus does not interfere with the second wireless base station neighboring the first wireless base station and the second wireless base station interpolates a dead region by the first wireless base station based on the first weighting factor adopted for the first wireless base station to direct a beam to the wireless communication apparatus, and transmits the second weighting factor to the second wireless base station to generate a beam. Thus, it achieves a stable communication without being interfered by the neighboring second wireless base station while reducing the dead region.

BRIEF DESCRIPTION OF DRAWINGS

FIG. 1 is a diagram illustrating a principle of a communication system according to an embodiment of the present invention;

Figure 2:
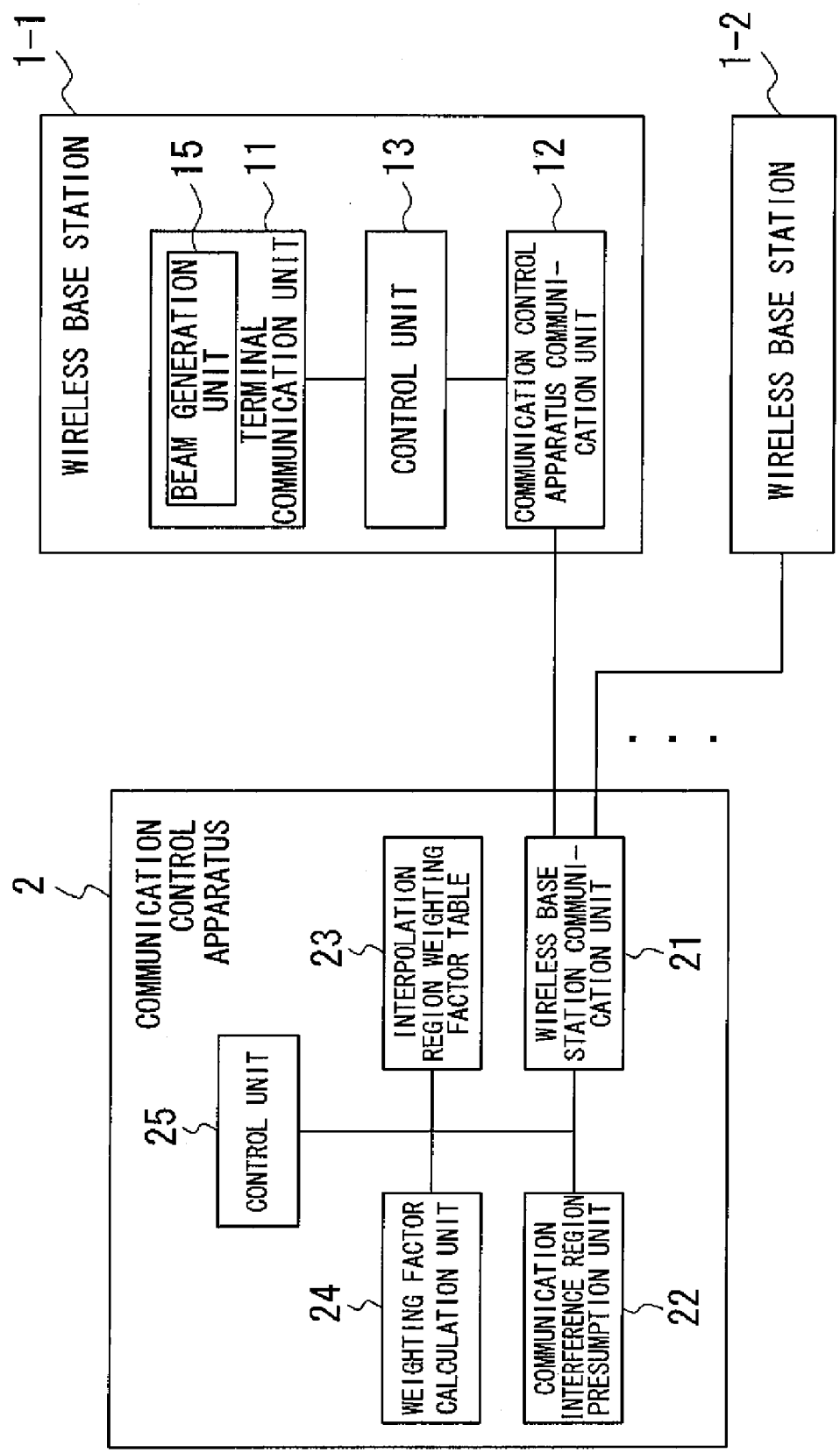
FIG. 2 is a functional block diagram illustrating a schematic constitution of main sections of each wireless base station and a communication control apparatus in the communication system shown in FIG. 1.

REFERENCE SIGNS LIST 1-1 to 1-3 wireless base station
2 communication control apparatus
3, 4 terminal (wireless communication apparatus)
5 building
11 terminal communication unit
12 communication control apparatus communication unit
13 control unit
15 beam generation unit 21 wireless base station communication unit
22 communication interference region presumption unit
23 interpolation region weighting factor table
24 weighting factor calculation unit
25 control unit

DESCRIPTION OF EMBODIMENTS

Embodiments of the present invention will be described with reference to the accompanying drawings.

FIG. 1 is a diagram illustrating a principle of a communication system according to an embodiment of the present invention. The communication system shown in FIG. 1 is provided with a plurality of wireless base stations 1-1, 1-2, ... and a communication control apparatus 2 for controlling the plurality of wireless base stations. Each of the wireless base stations 1-1, 1-2, ... (hereinafter referred to as a wireless base station 1 as well when indicating a single wireless base, station) is capable of wirelessly communicating with a terminal (wireless communication apparatus) 3 located in a communication area of the wireless base station 1 by use of the same frequency band and TDD with frame synchronization between the wireless base stations. In addition, each wireless base station 1 has a plurality of antennas and adopts an adaptive, array antenna to improve a link state by controlling directionality of the antenna to the terminal 3 communicating therewith. The terminal 3 has a position detecting function such as GPS and the likes.

In such a communication system, in a case where the terminal 3 is located in a communication interference region A by the wireless base stations 1-1 and 1-2 neighboring each other as shown in FIG. 1(a), since the terminal 3 simultaneously receives radio waves transmitted from both of the wireless base stations 1-1 and 1-2, communication is disconnected in a region where reception intensities of the transmitted radio waves are similar as stated above.

In order to prevent it, in the communication system of the present embodiment, when the wireless base station 1-1 communicates with the terminal 3, for example, the wireless base station 1-1 obtains location information of the terminal 3 therefrom and transmits the location information to the communication control apparatus 2. In addition, based on a signal received from the terminal 3, the wireless base station 1-1 calculates a weighting factor (first weighting factor) for maximizing the reception intensity, synthesizes the weighting factor to the reception signal as well as to a transmission signal so as to control the directionality of the antenna to direct a beam to the terminal 3, that is, to generate a beam having directionality to the terminal 3. In the communication system of the present embodiment, the weighting factor calculated by the wireless base station 1-1 is transmitted to the communication control apparatus 2.

Based on the location information of the terminal 3 in communication and the weighting factor adopted for the beam generation to the terminal 3 obtained from the wireless base station 1-1, the communication control apparatus 2 presumes a communication interference region by the neighboring wireless base station 1-2 and calculates a weighting factor (second weighting factor) for beam generation of the neighboring wireless base station 1-2 so as to avoid the communication interference region presumed and minimize a dead region. The weighting factor calculated is transmitted to the neighboring wireless base station 1-2 and also stored as a weighting factor for an interpolation region in a table to be used for next control.

Based on the weighting factor received from the communication control apparatus 2, the wireless base station 1-2 generates a beam to compensate the dead region of the wireless base station 1-1. Thereby, as shown in FIG. 1(b), the terminal 3 communicating with the wireless base station 1-1 is not interfered by the neighboring wireless base station 1-2 and the dead region of the wireless base station 1-1 is interpolated by the wireless base station 1-2.

Although the dead region of the wireless base station 1-1 communicating with the terminal 3 is interpolated by the neighboring wireless base station 1-2 in FIG. 1 for simplification of description, it is also possible to be interpolated by a plurality of neighboring wireless base stations.

FIG. 2 is a functional block diagram illustrating a schematic constitution of main sections of each wireless base station 1 and the communication control apparatus 2 in the communication system shown in FIG. 1. Each of the wireless base station 1 is similarly constituted and provided with a terminal communication unit 11 for wirelessly communicating with the terminal 3, a communication control apparatus communication unit 12 for wiredly or wirelessly communicating with the communication control apparatus 2, and a control unit 13 for controlling the entire operation. The terminal communication unit 11 is provided with a beam generation unit 15 which controls directionality of the antenna based on the weighting factor (first weighting factor) calculated based on a signal received from the terminal 3 during communication therewith and the weighting factor (second weighting factor or third weighting factor which will be described below) received from the communication control apparatus 2.

The communication control apparatus 2 is provided with a wireless base station communication unit 21 for communicating with the wireless base station 1, a communication interference region presumption unit 22, an interpolation region weighting factor table 23, a weighting factor calculation unit 24, and a control unit 25 for controlling the apparatus entirely.

Figure 3:
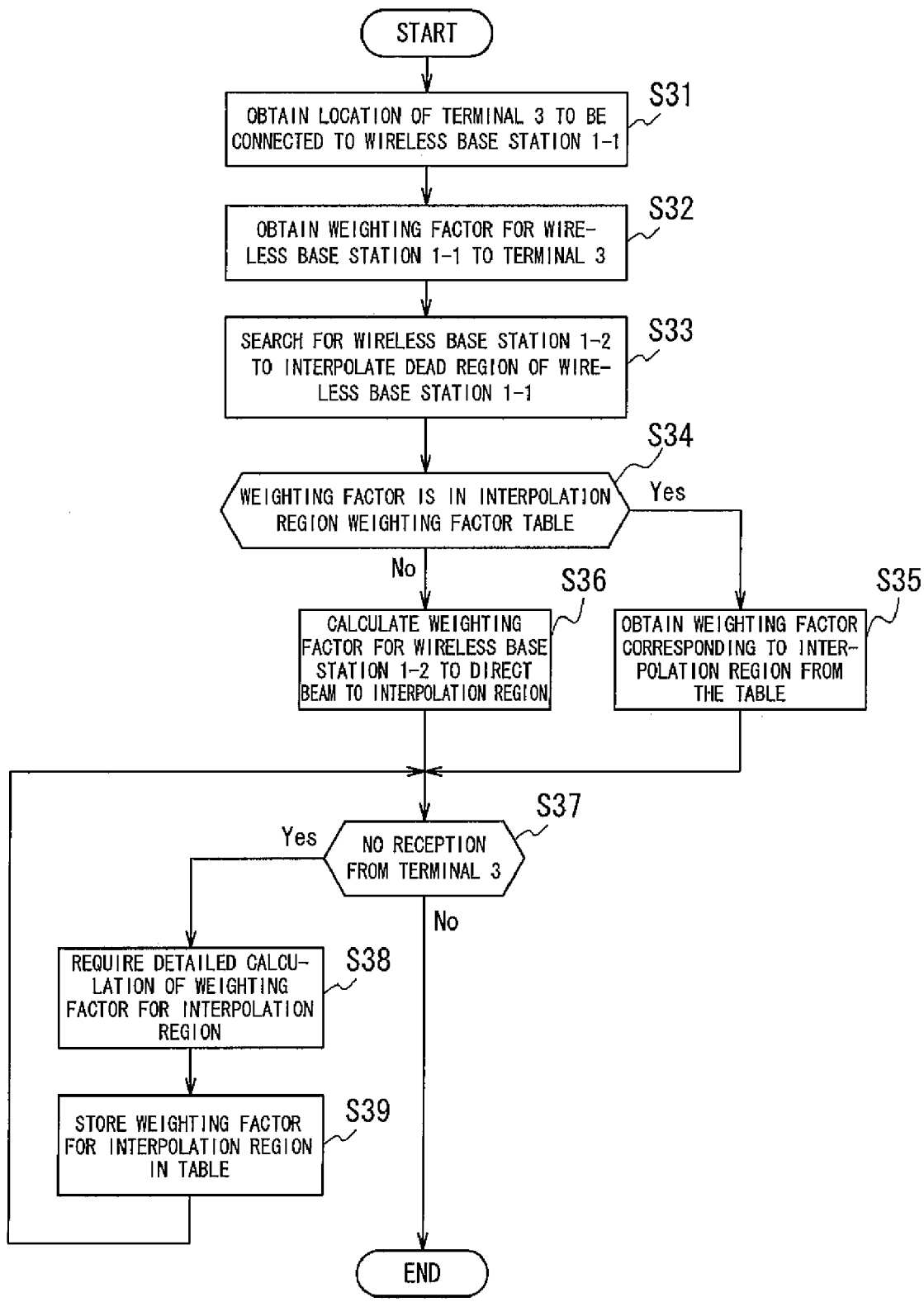
FIG. 3 is a flow chart illustrating operations of the communication control apparatus shown in FIG. 1.

FIG. 3 is a flow chart illustrating operations of the communication control apparatus 2 shown in FIG. 1. Following is specified operations of the present embodiment described with reference to FIG. 3.

For example, when the wireless base station 1-1 is communicating with the terminal 3, the wireless base station 1-1 obtains location information of the terminal 3 therefrom by the terminal communication unit 11 and transmits the location information to the communication control apparatus 2 by the communication control apparatus communication unit 12. In addition, the wireless base station 1-1 also transmits the weighting factor (first weighting factor), calculated based on a signal received from the terminal 3 to be adopted for the beam generation of the beam generation unit 15 of the terminal communication unit 11, to the communication control apparatus 2 by the communication control apparatus communication unit 12.

As shown in FIG. 3, the communication control apparatus 2 first obtains the location information of the terminal 3 transmitted from the wireless base station 1-1 via the wireless base station communication unit 21 (step S31) and then obtains the weighting factor adopted for the beam generation of the wireless base terminal 1-1 to the terminal 3 (step S32).

Subsequently, based on the location information and the weighting factor obtained from the wireless base station 1-1, the communication control apparatus 2 searches for the wireless base station 1-2 neighboring the wireless base station 1-1 to the location of the terminal 3 and presumes a communication interference region to the terminal 3 by the wireless base stations 1-1 and 1-2, with the communication interference region presumption unit 22 (step S33). After presuming the communication interference region, the control unit 25 searches whether a weighting factor (second weighting factor) for the wireless base station 1-2 to direct a beam to the dead region of the wireless base station 1-1, that is, the interpolation region by the wireless base station 1-2 so as to avoid the communication interference region presumed is already stored in the interpolation region weighting factor table 23 (step S34).

In a case where a corresponding weighting factor is found out from the interpolation region weighting factor table 23 as a result, the control unit 25 obtains the weighting factor (step S35) and transmits the weighting factor from the wireless base station communication unit 21 to the neighboring wireless base station 1-2. Thereby, the wireless base station 1-2 controls the beam generation unit 15 to direct a beam to the interpolation region.

On the contrary, in a case where the corresponding weighting factor is not found out in the interpolation region weighting factor table 23, the control unit 25 controls the weighting factor calculation unit 24 to calculate a weighting factor (second weighting factor) for the wireless base station 1-2 to direct a beam to the interpolation region stated above based on the location information and the weighting factor obtained from the wireless base station 1-1 (step S36), and stores the weighting factor calculated in the interpolation region weighting factor table 23 as well as transmitting the weighting factor to the neighboring wireless base station 1-2 via the wireless base station communication unit 21. Thereby, the wireless base station 1-2 controls the beam generation unit 15 to direct the beam to the interpolation region. It is to be noted that the calculation process of the weighting factor by the weighting factor calculation unit 24 is described below.

Subsequently, the communication control apparatus 2 inquires the wireless base station 1-1 about whether the wireless base station 1-1 has received a signal transmitted from the terminal 3 (step S37). In a case where the wireless base station 1-1 has received a signal transmitted from the terminal 3 as a result, the control unit 25 assumes that there is no communication interference region to the terminal 3 and ends the process.

On the contrary, in a case where the wireless base station 1-1 could not receive a signal transmitted from the terminal 3, the control unit 25 assumes that the terminal 3 is located in the communication interference region by the neighboring wireless base station 1-2 and requires the weighting factor calculation unit 24 of a detailed calculation of the weighting factor for the interpolation region (step S38). Then, the control unit 25 updates the entry of the weighting factor (third weighting factor) calculated in detail by the weighting factor calculation unit 24 in the interpolation region weighting factor table 23 (step S39) and transmits the weighting factor to the neighboring wireless base station 1-2, and then the process flow proceeds to a step S37. The wireless base station 1-2 thereby controls the beam generation unit 15 to direct a beam to the interpolation region in a similar manner. The detailed calculation process of the weighting factor to the interpolation region by the weighting factor calculation unit 24 is described below.

Accordingly, in the present embodiment, the communication control apparatus communication unit 12 of the wireless base station 1-1 forms a first transmission unit, while the wireless base station communication unit 21 of the communication control apparatus 2 forms a first reception unit, a second transmission unit and a first weighting factor obtainment unit and the communication control apparatus communication unit 12 of the wireless base station 1-2 forms a second reception unit.

Next comes a description about the calculation process of the weighting factor to the interpolation region by the weighting factor calculation unit 24 of the communication control apparatus 2.

First, before calculation of the weighting factor, the weighting factor calculation unit 24 searches for a dead region of the wireless base station 1-1. Following is a description of an example of a search process for a dead region. First, map information is disposed on a voxel space and a building based on the map information (having a reflection factor) is constituted on the voxel space. In addition, the weighting factor calculation unit 24 obtains antenna arrangement information of each neighboring wireless base station 1 including the wireless base station 1-1, and sets directionality of the antenna of the wireless base station 1-1 communicating with the terminal 3 in priority to a weight to the terminal 3 while setting the antenna of the wireless base station not wirelessly connected to other terminal to have non-directionality.

Figure 4:
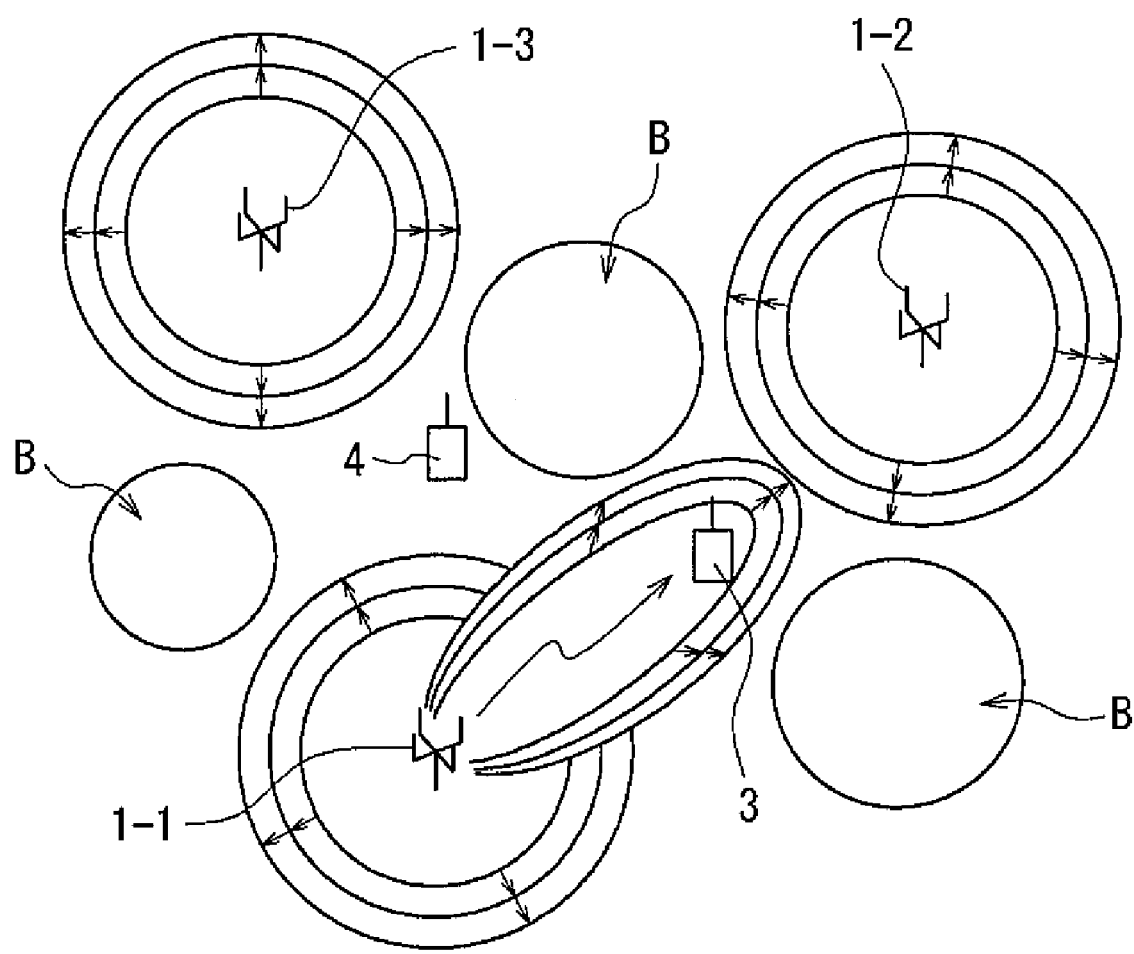
FIG. 4 is a diagram illustrating a search process of a dead region by a wireless base station.

For example, as shown in FIG. 4, when the terminals 3 and 4 are located in an area where there are the wireless base stations 1-1 to 1-3 and the terminal 3 is communicating with the wireless base station 1-1 while the terminal 4 is in a standby state, since the wireless base stations 1-2 and 1-3 are not communicating with either terminal, antennas of the wireless base stations 1-2 and 1-3 are set to be non-directional. For the wireless base station 1-1 communicating with the terminal 3, directionality of an antenna used for the communication with the terminal 3 is set in priority to the weight to the terminal 3, while the other antennas unrelated to the communication is set to be non-directional.

In this state, the weighting factor calculation unit 24 obtains a transmission power property of each wireless base station 1 and evenly expands the transmission power property with each wireless base station 1 as a center thereof. At this point, when the transmission power property is expanded on the voxel space and hit a building and the likes, an expansion direction is changed in accordance with a reflection property at a hitting point.

The weighting factor calculation unit 24 repeats an expansion step of the transmission power property and, when the transmission power property of the wireless base station 1-1 communicating with the terminal 3 and the transmission power property of the neighboring wireless base station 1-2 come in contact with each other, stops the expansion step and, in this state, sets a region not included in the transmission power property of each of the wireless base station 1-1 and neighboring wireless base stations 1-2 and 1-3 as a dead region B of the wireless base station 1-1.

After thereby searching for the dead region B of the wireless base station 1-1, the weighting factor calculation unit 24 calculates a weight including the dead region B for each of the neighboring wireless base stations 1-2 and 1-3 by use of the antenna uninvolved in communication with a terminal.

Figure 5:
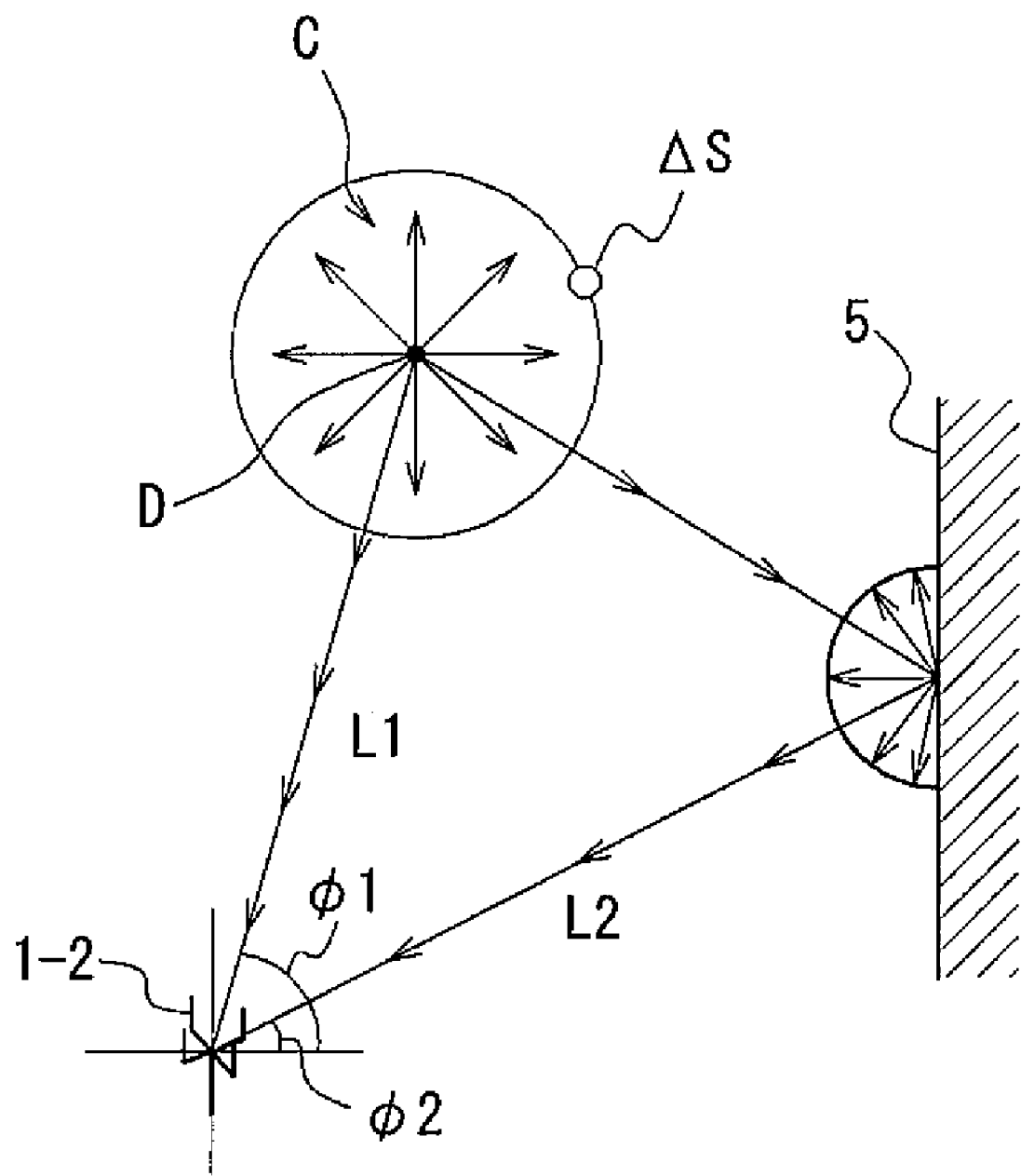
FIG. 5 is a diagram illustrating a calculation process of a weighting factor to an interpolation region.

Next comes a description of an example of the calculation process of the weighting. First, as shown in FIG. 5, a desired dead region B is defined as a target region C and a desired point of the target region C is calculated as a representative point D in the voxel space. Then, a ray of light is emitted from the representative point D to all directions by use of the ray tracing method. When hitting a building 5 and the likes, the ray of light is diffused into a predetermined number of rays based on the reflection property (for example, Lambert reflection) at a hitting point and a normal vector.

When a surviving value of the ray of light becomes equal to or less than a predetermined value because of an attenuation property according to a travel distance, the ray of light is eliminated (tracing is ended). At this point, the surviving value of the ray of light is calculated based on the attenuation property of the transmission power. More specifically, since the transmission power attenuates inversely proportion to the square of the distance, power P(R) passing through a minute area ΔS on a sphere having a distance R as a radius thereof fulfills P(R)=ΔS/(4πR²)×P, provided that an original transmission power is defined as the P. Accordingly, when the surviving value P(R) becomes equal to or less than the predetermined value, the ray of light is eliminated. In this case, in consideration of directing a beam from the neighboring wireless base station (the wireless base station 1-2 in FIG. 5) at the end to the dead region C including the representative point D, the original transmission power P is preferably the transmission power of the wireless base station 1-2 when directing a beam.

When the ray of light reaches the neighboring base station 1-2, a value in accordance with a optical path and reflection (the power attenuated by an optical path length and reflection) at that time is added as an electric field property at the representative point D and a trace of the ray of light is ended.

Subsequently, a virtual transmission power property is formed based on an arrival angle ø of the ray of light to the antenna of the neighboring wireless base station 1-2 and the surviving value of the ray of light. In this case, a beam direction of the antenna is a direction of the ray of light, among rays of light arriving at the wireless base station 1-2, having the maximum power when arriving at the wireless base station 1-2. However, in a case where there are a plurality of rays of light having the maximum power, a retardation (Ln/(1/f)) is calculated from the optical path length Ln and a carrier frequency f of each of the rays of light. A histogram is obtained by segmentalizing the retardation at a specific angle, and a ray of light included in the segment with the highest number is defined as valid so as to define the direction of the ray of light as the beam direction.

In a case where rays of light reach not one neighboring wireless base station but a plurality of neighboring wireless base stations, total powers of the ray of light by which the beam direction is determined for each wireless base station (the power when the ray of light arrives at the base station if there is a single ray of light, or total of a plurality of rays of light when they are selected) are compared to one another and a wireless base station with the highest total power is selected so that only the selected wireless base station directs a beam to the representative point.

Then; the weighting factor is calculated from the virtual transmission power property so that a peak of the beam meets a direction with high surviving value and a null meets a direction with low surviving value.

When there is a requirement for the detailed calculation, the weighting factor is calculated in detail under a higher resolution condition than that of previous calculation of the weighting factor by, for example, increasing (doubling, for example) the number of rays of light from the representative point D (in a different direction), increasing the number of rays of light diffused at the reflection point (doubling, for example) or segmentalizing the voxel (for example, one side of the voxel is changed to correspond to from 10 m in a real space to 5 m, a half thereof).

As described above, in the communication system of the present embodiment, based on the first weighting factor adopted for the wireless base station 1-1 to direct a beam to the terminal 3 communicating therewith, the communication control apparatus 2 calculates the second weighting factor so that the terminal 3 does not interfere with the wireless base station 1-2 neighboring the wireless base station 1-1 and the wireless base station 1-2 interpolates the dead region of the wireless base station 1-1, and transmits the second weighting factor to the wireless base station 1-2 to generate a beam by controlling the directionality of the antenna of the wireless base station 1-2. Accordingly, the terminal 3 is capable of communicating stably without being interfered by the neighboring wireless base station 1-2 while reducing the dead region.

It is to be understood that the present invention is not limited to the embodiment described above but may be varied or altered in a multiple of manners. For example, although the neighboring wireless base stations use the same frequency band in the embodiment described above, it is also possible to effectively adopt a configuration of the present embodiment even when different frequency bands are used, in a case where a radio wave transmitted from the neighboring wireless base station acts as an interfering radio wave.

The invention claimed is:

1. A communication control method for a communication system including a plurality of wireless base stations having adaptive array antennas and a communication control apparatus for controlling the plurality of wireless base stations, comprising:

a first weighting factor obtainment step at which the communication control apparatus obtains a first weighting factor adopted for beam generation of a first wireless base station, among the plurality of wireless base stations, which directs a beam to a wireless communication apparatus;

a communication interference region presumption step at which the communication control apparatus presumes a communication interference region between the first wireless base station and a second wireless base station, among the plurality of the wireless base stations, neighboring the first wireless base station based on the first weighting factor obtained;

a second weighting factor calculation step at which the communication control apparatus calculates a second weighting factor to be adopted for beam generation of the second wireless base station so as to avoid the presumed communication interference region and to interpolate a dead region by the first wireless base station;

a transmission step at which the communication control apparatus transmits information on the second weighting factor calculated to the second wireless base station;

a reception step at which the second wireless base station receives the information on the second weighting factor transmitted from the communication control apparatus; and a beam generation step at which the second wireless base station generates a beam based on the information on the second weighting factor received.

2. The communication control method according to claim 1, further comprising:

a wireless base station recognition step at which the communication control apparatus recognizes a configuration state of the plurality of wireless base stations based on a virtual space information based on a map;

a signal obtainment recognition step at which the communication control apparatus recognizes whether the first wireless base station has obtained a signal from the wireless communication apparatus after the second wireless base station generates a beam based on the received information on the second weighting factor;

a third weighting factor calculation step at which the communication control apparatus calculates a third weighting factor to be adopted for beam generation of the second wireless base station based on the virtual space information so as to avoid the presumed communication interference region, in a case where the first wireless base station has not obtained a signal from the wireless communication apparatus as a result of the recognition;

a second transmission step at which the communication control apparatus transmits information on the third weighting factor calculated to the second wireless base station;

a second reception step at which the second wireless base station receives the information on the third weighting factor transmitted from the communication control apparatus; and a second beam generation step at which the second wireless base station generates a beam based on the received information on the third weighting factor.

3. The communication control method according to claim 2, wherein the virtual space information includes information on a building based on the map, the second weighting factor is calculated based on a ray tracing method at the second weighting factor calculation step, and the third weighting factor is calculated based on the ray tracing method under a condition of a higher resolution than that of the calculation of the second weighting factor at the third weighing factor calculation step.

4. The communication control method according to claim 2, wherein the third weighting factor calculated at the third weighting factor calculation step is kept correspondingly to the virtual space information at calculation of the third weighting factor, and then adopted as the second weighting factor.

5. The communication control method according to claim 3, wherein the third weighting factor calculated at the third weighting factor calculation step is kept correspondingly to the virtual space information at calculation of the third weighting factor, and then adopted as the second weighting factor.

6. A communication system including a plurality of wireless base stations having adaptive array antennas and a communication control apparatus for controlling the plurality of wireless base stations, wherein a first wireless base station, among the plurality of wireless base stations, which directs a beam to a wireless communication apparatus comprises:

a first transmission unit for transmitting information on a first weighting factor adopted for generation of the beam to the communication control apparatus, the communication control apparatus comprises:

a first reception unit for receiving the information on the first weighting factor transmitted from the first wireless base station;

a communication interference region presumption unit for presuming a communication interference region between the first wireless base station and a second wireless base station, among the plurality of the wireless base stations, neighboring the first wireless base station based on the first weighting factor received;

a second weighting factor calculation unit for calculating a second weighting factor to be adopted for beam generation of the second wireless base station so as to avoid the presumed communication interference region and to interpolate a dead region by the first wireless base station; and a second transmission unit for transmitting information on the second weighting factor calculated to the second wireless base station, and the second wireless base station comprises:

a second reception unit for receiving the transmitted information on the second weighting factor; and a beam generation unit for generating a beam based on the received information on the second weighting factor.

7. A communication control apparatus for controlling a plurality of wireless base stations having adaptive array antennas, comprising:

a first weighting factor obtainment unit for obtaining a first weighting factor adopted for beam generation of a first wireless base station, among the plurality of wireless base stations, which directs a beam to a wireless communication apparatus;

a communication interference region presumption unit for presuming a communication interference region between the first wireless base station and a second wireless base station, among the plurality of the wireless base stations, neighboring the first wireless base station based on the first weighting factor obtained;

a second weighting factor calculation unit for calculating a second weighting factor to be adopted for beam generation of the second wireless base station so as to avoid the presumed communication interference region and to interpolate a dead region by the first wireless base station; and a transmission unit for transmitting information on the second weighting factor calculated to the second wireless base station.

* * * * *